United States Patent [19]
Sala

[11] Patent Number: 5,687,640
[45] Date of Patent: Nov. 18, 1997

[54] PANCAKE BATTER DISPENSING DEVICE AND APPARATUS FOR MAKING PANCAKES

[76] Inventor: André Sala, Route du stade, 74410 Saint-Jorioz, France

[21] Appl. No.: 693,323
[22] PCT Filed: Feb. 1, 1995
[86] PCT No.: PCT/FR95/00117
§ 371 Date: Oct. 22, 1996
§ 102(e) Date: Oct. 22, 1996
[87] PCT Pub. No.: WO95/20880
PCT Pub. Date: Aug. 10, 1995

[30] Foreign Application Priority Data

Feb. 4, 1994 [FR] France ................................ 94 01479

[51] Int. Cl.⁶ .......................... A47J 37/00; A47J 37/06; A47J 37/10; A21B 1/48
[52] U.S. Cl. ............................ 99/423; 99/353; 99/407
[58] Field of Search ............................ 99/326–334, 349, 99/373, 386–391, 395, 353–355, 407, 422–425, 444–446; 100/98 R; 219/200, 445, 524, 525, 462–465; 222/272, 271, 280, 281; 426/523, 510

[56] References Cited

U.S. PATENT DOCUMENTS

| 3,215,062 | 11/1965 | Frankenberg | 99/353 |
| 3,427,956 | 2/1969 | Jaffe | 99/423 |
| 3,593,652 | 7/1971 | Lostanlen | 99/423 |
| 3,630,140 | 12/1971 | Marrie | 99/423 |
| 3,683,150 | 8/1972 | Kehl et al. | 219/200 |
| 3,718,487 | 2/1973 | Brunner | 99/353 |
| 3,853,045 | 12/1974 | Marrie | 99/423 |
| 3,937,137 | 2/1976 | Marrie | 99/423 |
| 3,975,998 | 8/1976 | Marrie | 99/335 X |
| 3,978,781 | 9/1976 | Tanguy | 99/443 R |
| 4,082,033 | 4/1978 | Fester | 99/406 |
| 4,227,447 | 10/1980 | Bronnec | 99/423 |
| 4,583,451 | 4/1986 | Kanagy | 99/446 X |
| 4,733,608 | 3/1988 | Merdy | 99/424 X |
| 5,320,030 | 6/1994 | Hubbard | 99/374 X |
| 5,481,963 | 1/1996 | Sesona et al. | 99/335 |

FOREIGN PATENT DOCUMENTS

| 1284059 | 1/1962 | France . |
| 2204946 | 5/1974 | France . |
| WO 92/07469 | 5/1992 | WIPO . |

Primary Examiner—Timothy F. Simone
Attorney, Agent, or Firm—Fay, Sharpe, Beall, Fagan, Minnich & McKee

[57] ABSTRACT

A hot plate (7) is mounted in an opening of a platform (4) mounted on a work surface (400). An opening (38) surrounds the hot plate to permit excess batter to be discharged into a drawer (39). A batter dispenser (3) includes a container (9) which is pivotally mounted on a vertical axle (35). The container is pivoted from the side over the center (Cp) of the hot plate. A hand lever (17) is depressed, raising a stopper (14), permitting batter to flow through an outlet (13) onto the hot plate.

12 Claims, 10 Drawing Sheets

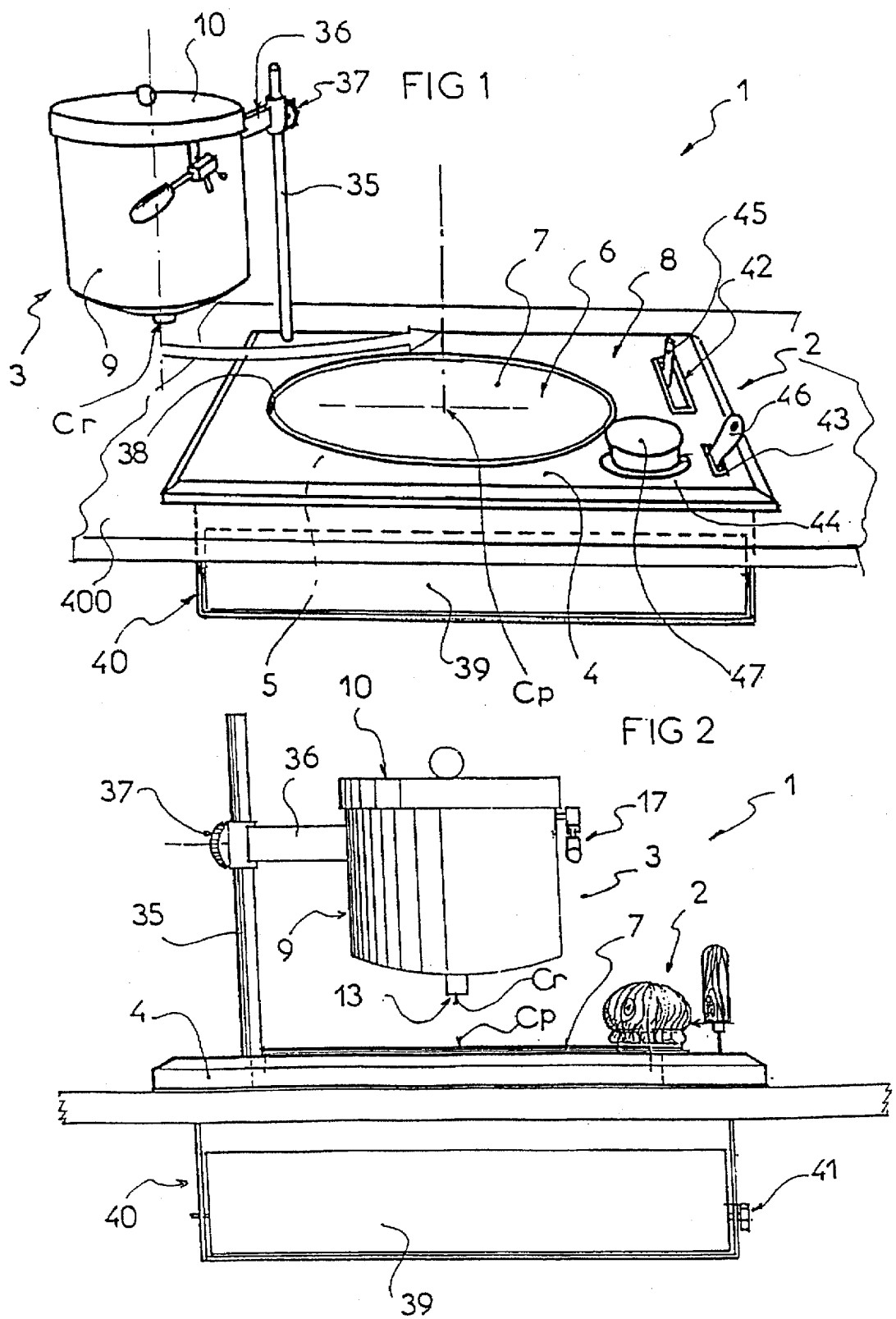

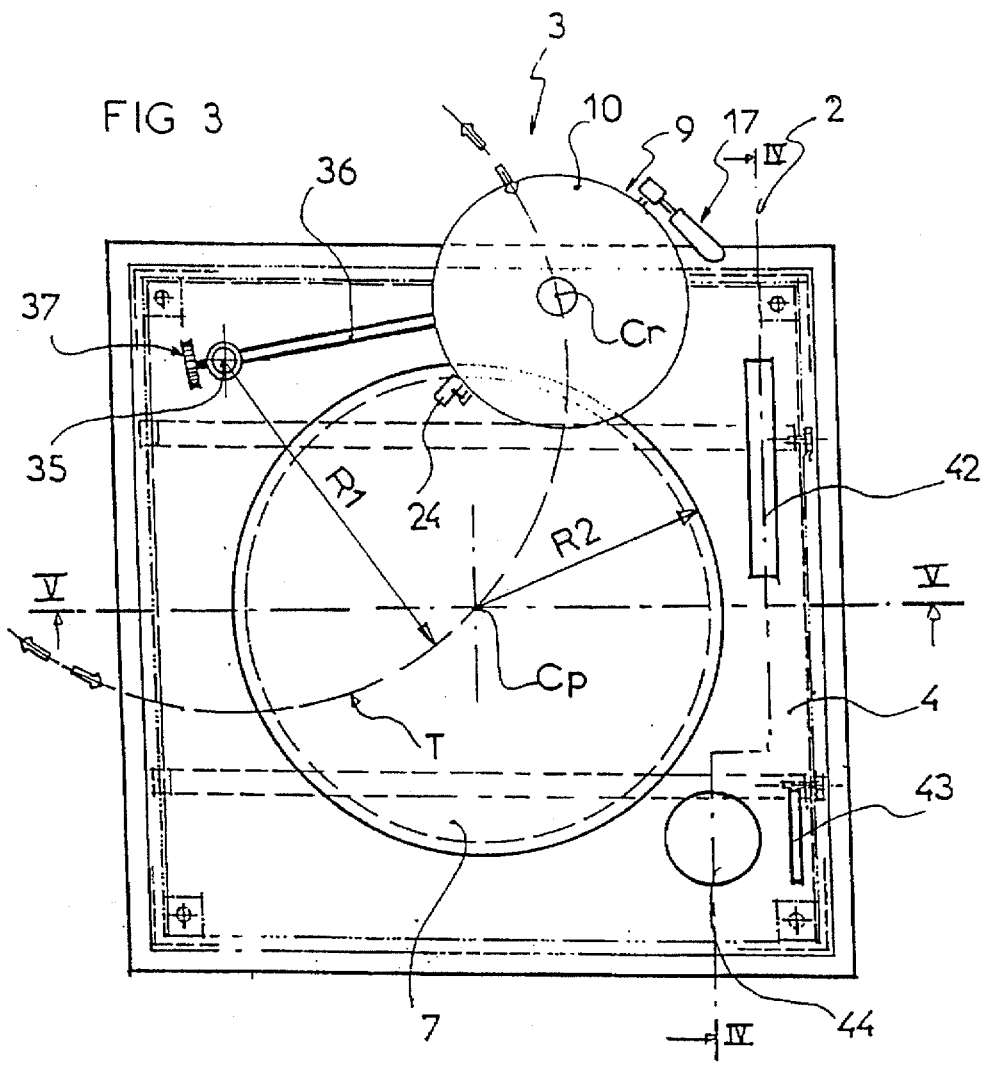
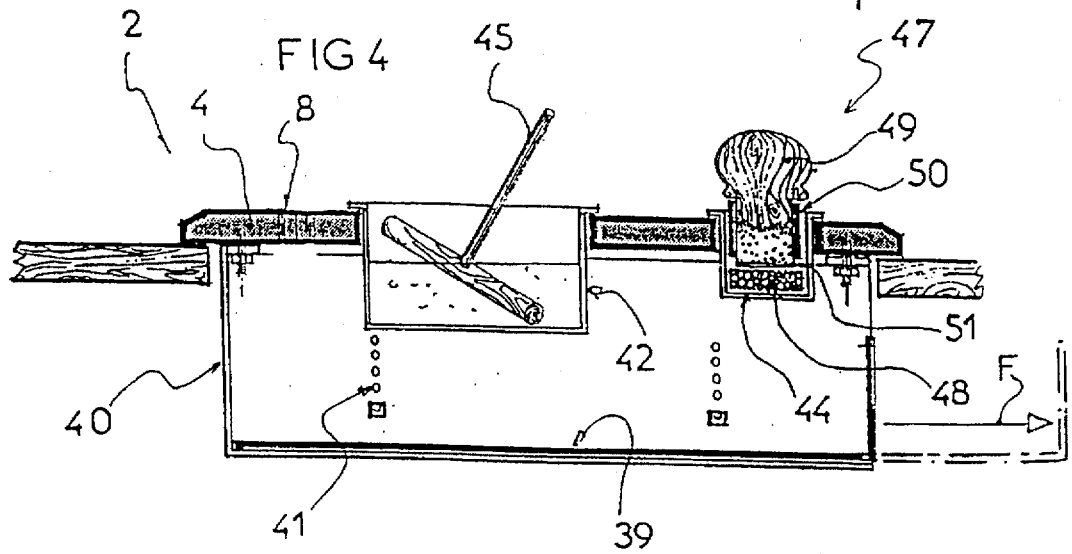

PANCAKE BATTER DISPENSING DEVICE AND APPARATUS FOR MAKING PANCAKES

The present invention relates to an improvement of an apparatus for making pancakes. The present invention is more particularly concerned with a pancake batter dispensing device.

Pancake making is well-known to all and consists of pouring liquid batter on a hot, greased griddle; the batter, because of the heat from the griddle changes consistency becoming the finished product. The hot griddle is either a frying pan or a hotplate. In commercial pancake making, it is always a hotplate which is used and customers have been able to buy pancakes as such, the vendors making the pancakes to the order and in front of the customer. This type of pancake making is quite craftsman-like, the vendor using a simple hotplate on a platform, while the pancake batter is kept in a bowl where the batter is withdrawn little by little with a ladle which contains enough batter to make a pancake. Thus, the device used is neither practical, nor aesthetic, nor hygienic.

Therefore, the present invention attempts to resolve the inconveniences of the traditional devices and suggests a batter dispenser which is particularly simple, practical, reliable and hygienic; and that a device is equipped with such a dispenser.

Thus, the pancake batter dispensing device for an apparatus for making pancakes according to the invention includes a hotplate and is constituted by a container which contains the batter and includes a flow outlet with an opening and closing assembly and the means of controlling the flow of batter.

According to one of the corresponding characteristics, the pancake batter dispensing device is movable in relation to the hotplate, between a resting position in which the container is outside of the zone occupied by the hotplate, and a dispensing position in which the flow outlet is placed above and in the center of the hotplate, and according to the preferred device, it is pivotly mounted around a vertical axle on which it is retained by a retaining arm.

According to another corresponding characteristic, the flow outlet includes a stopper in a closed position where the flow of batter contained in the container is prevented, and which is movable to an open position which permits the flow of said batter, the movement of the said stopper being controlled by a control means including a handlever linked to the stopper by a transmission device, which includes, for example, a transverse axle connected to a handlever, the transverse axle being linked to a vertical shaft connected to the stopper.

Furthermore, the invention is also concerned with an apparatus for making pancakes which includes a dispensing device and a work unit constituted by a platform which includes at least one opening in which at least one heating mechanism is fitted, the said apparatus including a lower housing which houses the heating mechanism and includes a sliding drawer for eventual recovery of excess batter and drippings caused by cooking which are scraped off after the pancake is made. According to a preferred embodiment of the invention, the device includes refrigeration means for refrigeration of the container of batter which introduces, it is well-understood, an additional advantageous improvement in the matter of hygiene; that which permits a better conservation of the batter and stops the eventual development of bacteria. For this purpose, the container is surrounded by a coil in which circulates a refrigerated fluid, like, for example, a refrigeration unit.

Other characteristics and advantages of the invention will be disclosed in the description which follows with regard to the following drawings which are given only as examples and not for limitation.

FIGS. 1 through 5 illustrate an apparatus according to the invention.

FIG. 1 is a perspective view, the batter dispenser being in a resting position.

FIG. 2 is a frontal view, the batter dispenser being in the center position of distribution.

FIG. 3 is a top view illustrating more particularly the possible movement of the dispenser.

FIG. 4 is a cross-sectional view according to IV—IV of FIG. 3.

FIG. 5 is a cross-sectional view according to V—V, the dispenser being in a center position of distribution.

Figure 6:
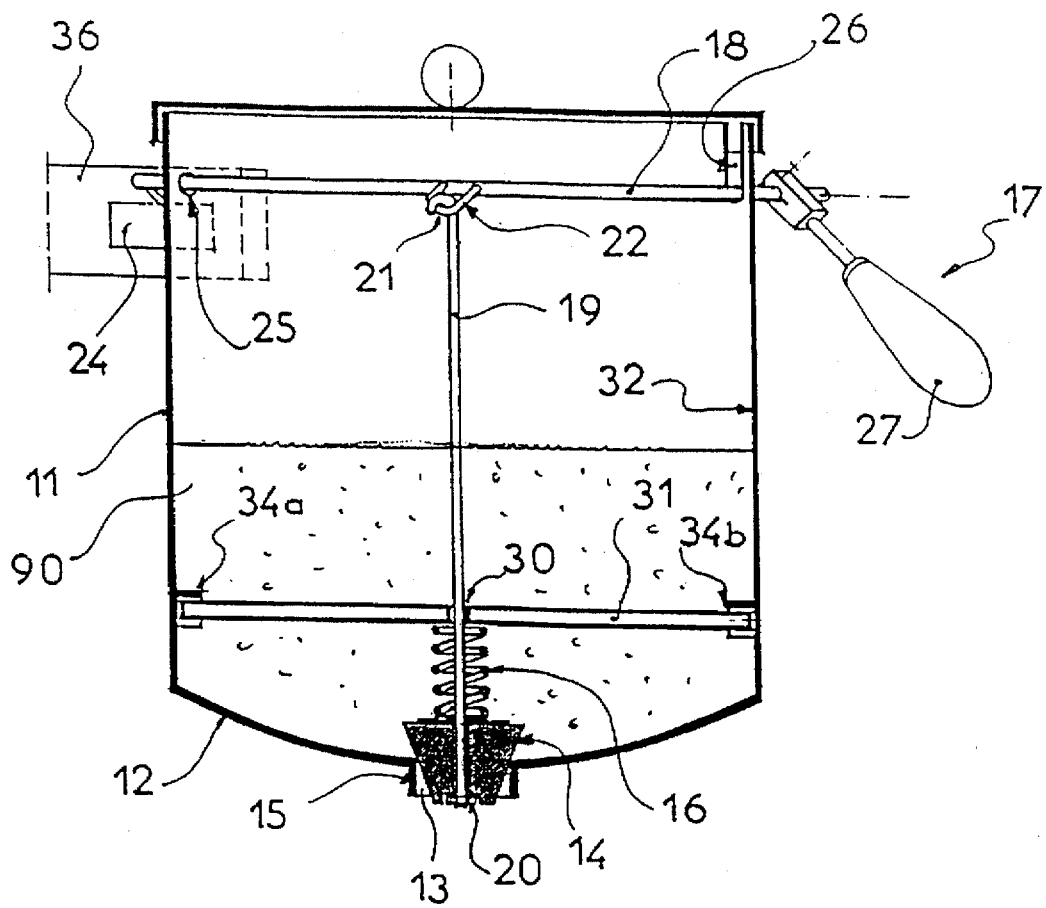
Figure 7:
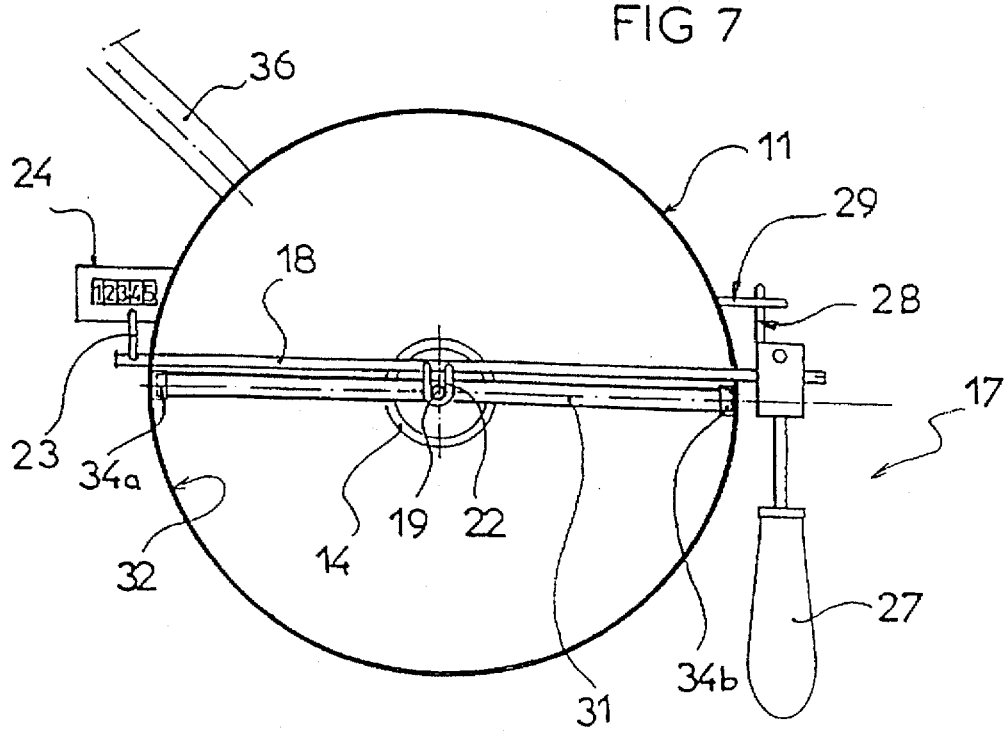
Figure 8:
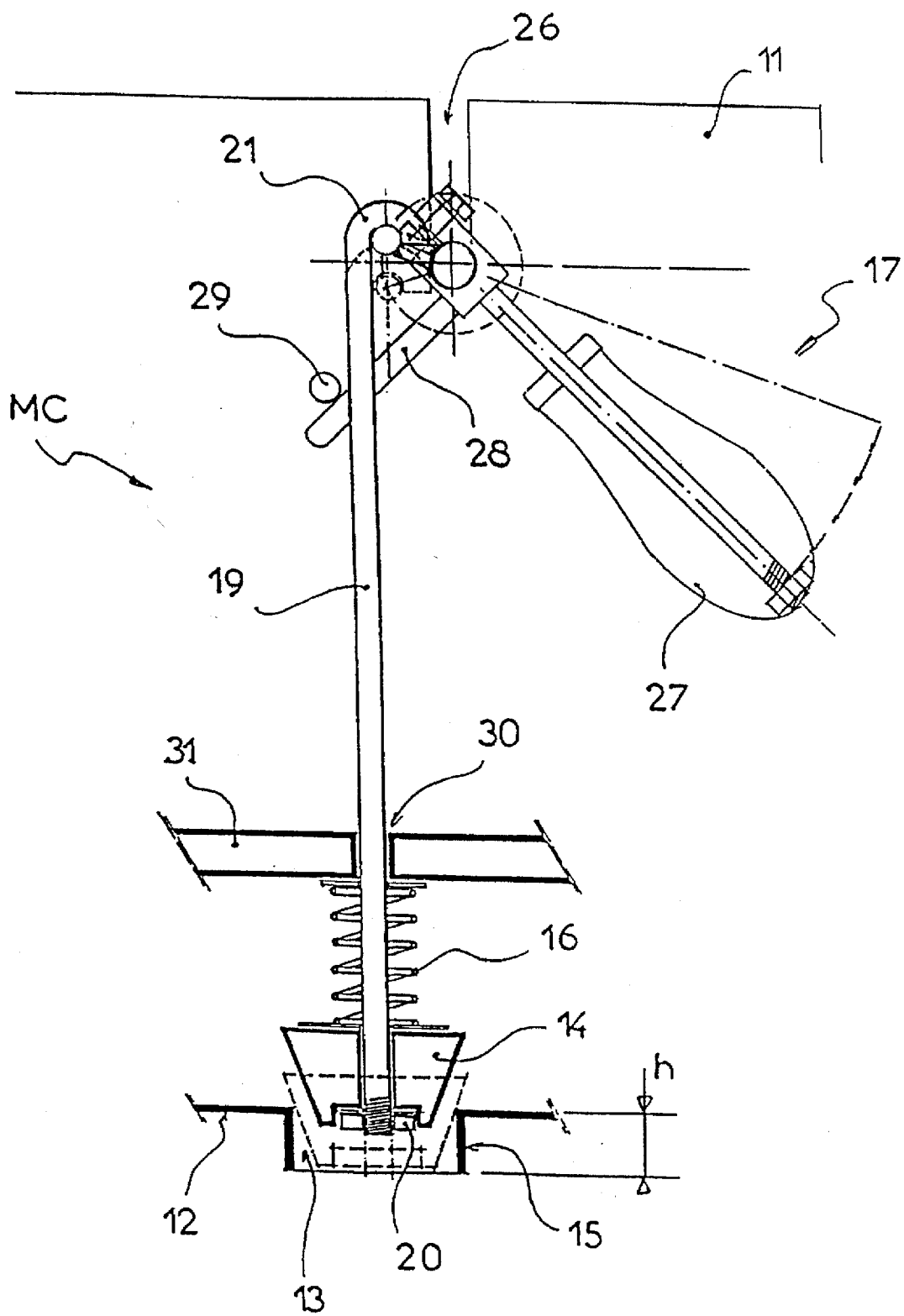

FIGS. 6, 7, and 8 illustrate the batter dispensing device in more descriptive detail.

FIG. 6 is a cross-sectional view.

FIG. 7 is a top view of the dispensing device, the lid having been removed.

FIG. 8 is a detailed view in grand scale of the control means.

Figure 9:
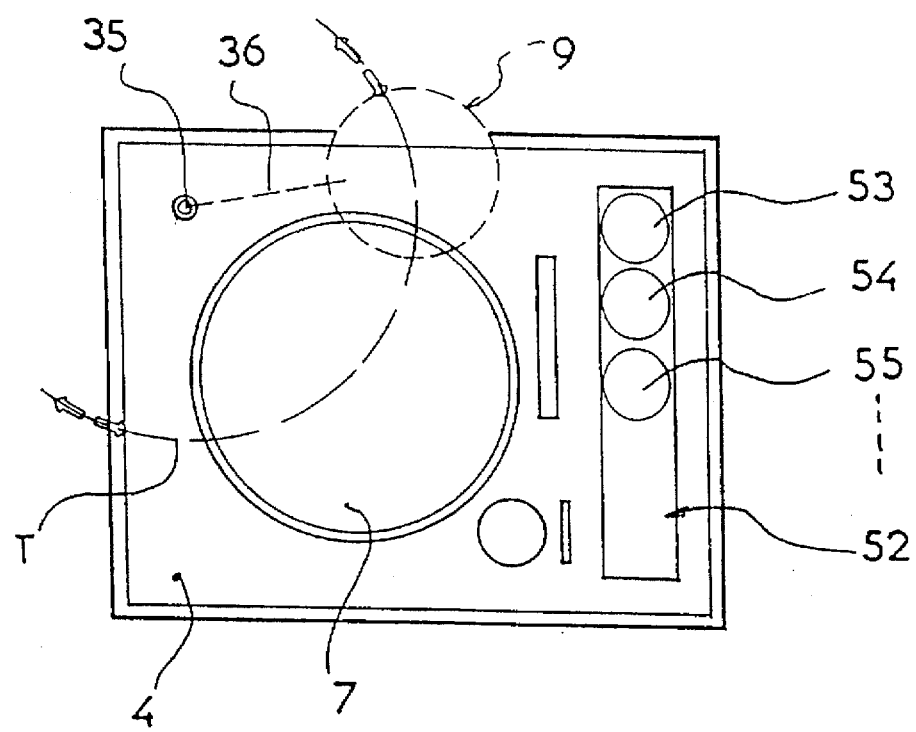
Figure 10:
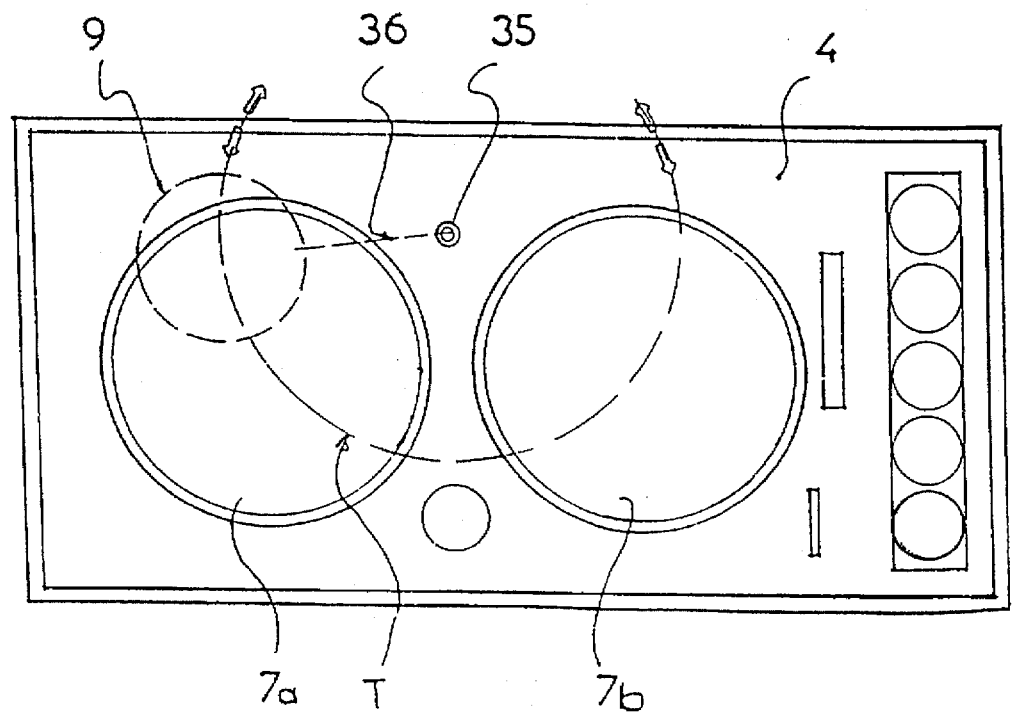

FIGS. 9 and 10 are top views illustrating the alternate embodiments.

Figure 5:
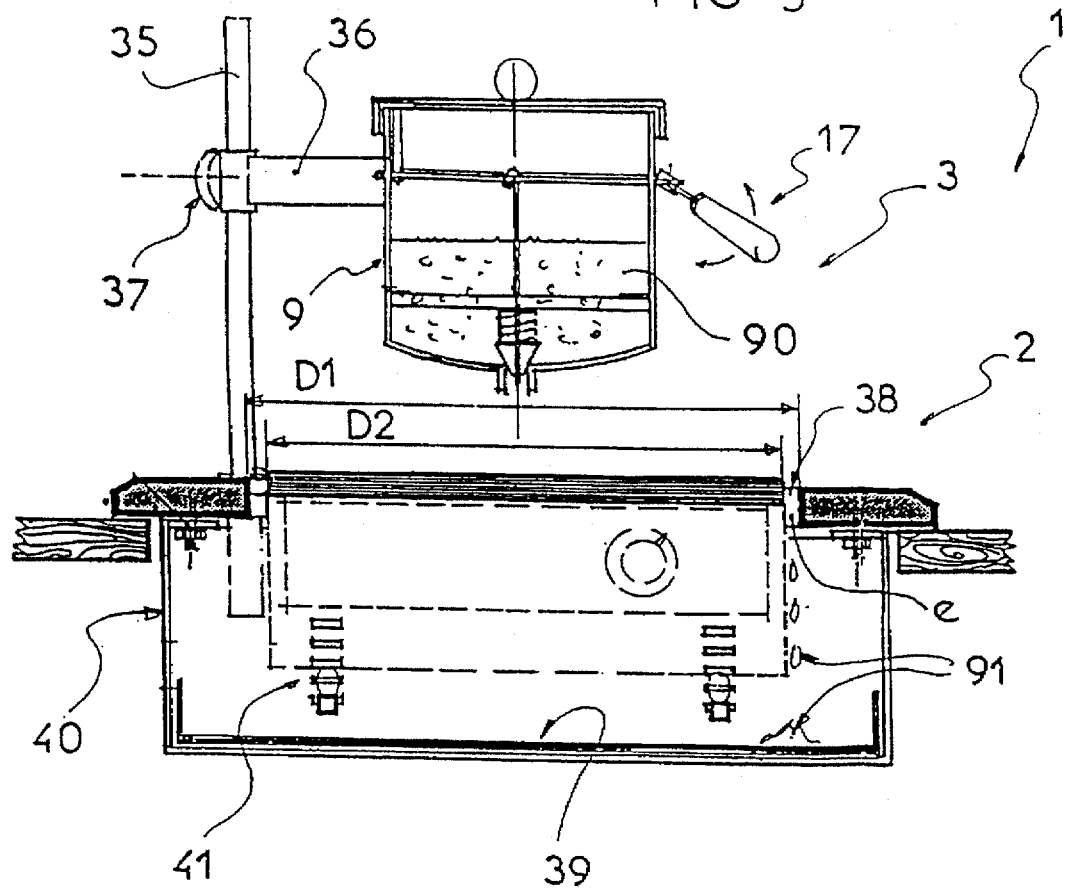
Figures 11, 12:
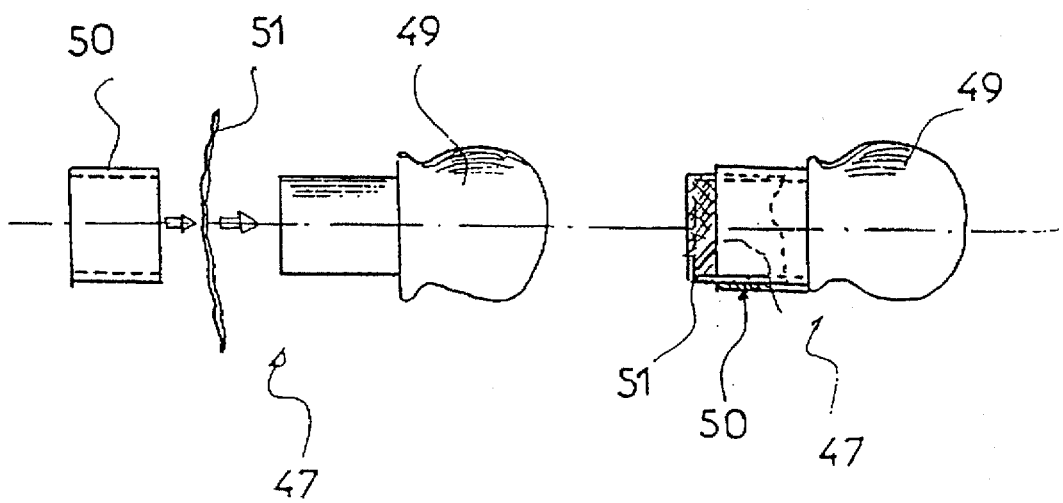

FIGS. 11 and 12 represent the oiler of the apparatus, FIG. 11 being a view of the oiler in a dismantled position while FIG. 12 is a view of the oiler in an assembled position of usage in partial phantom.

Figure 13:
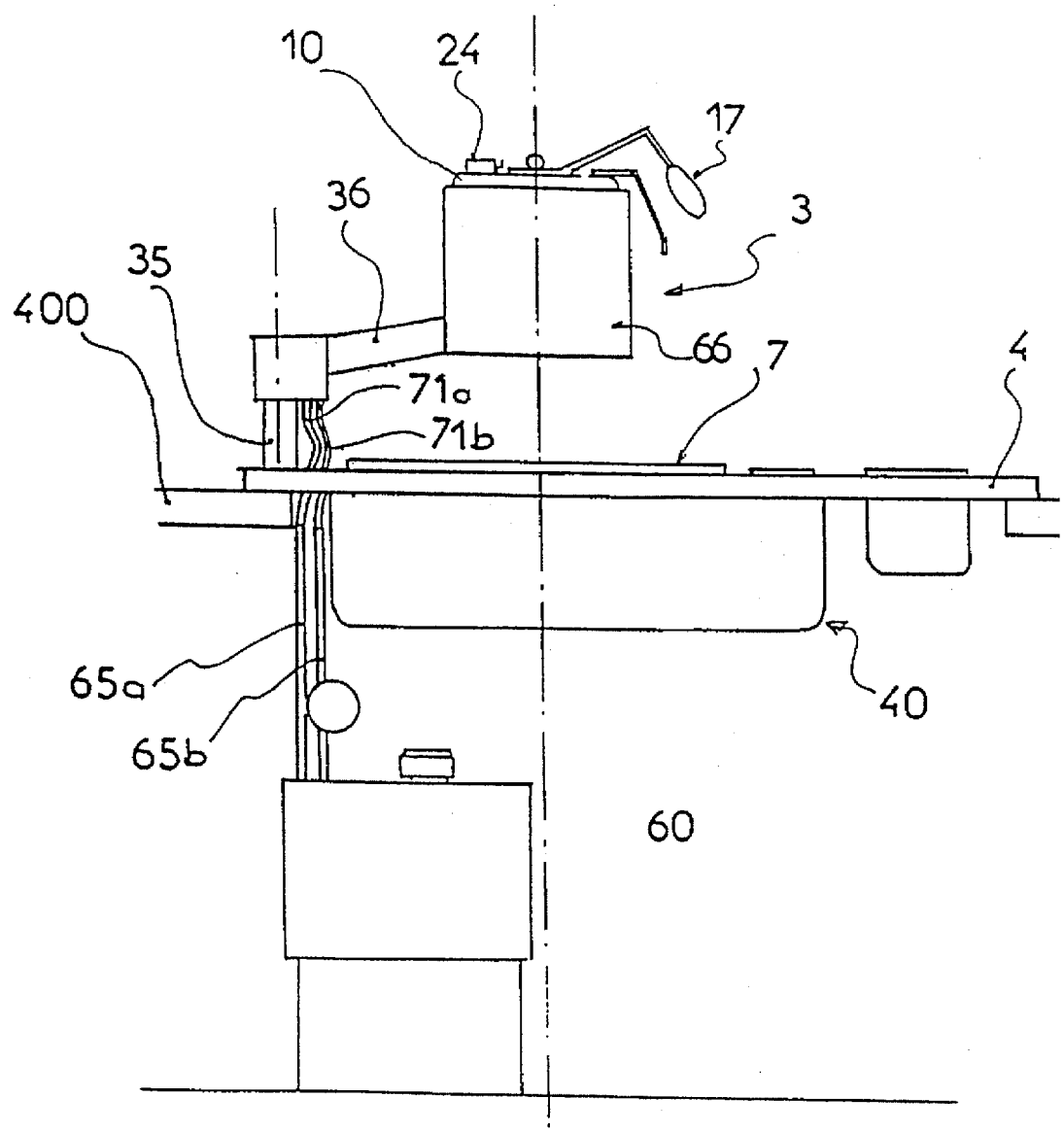
Figure 14:
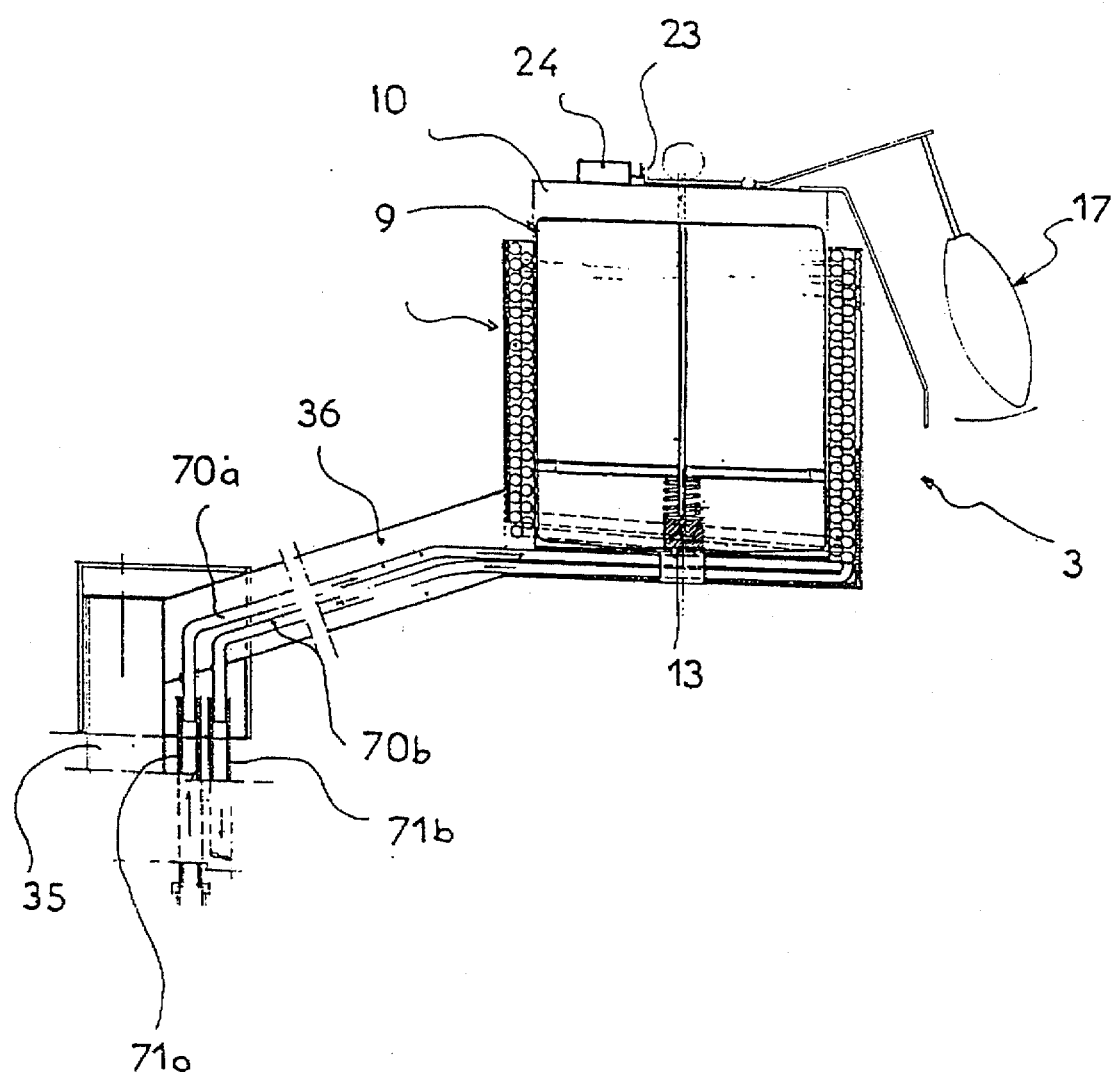
Figure 15:
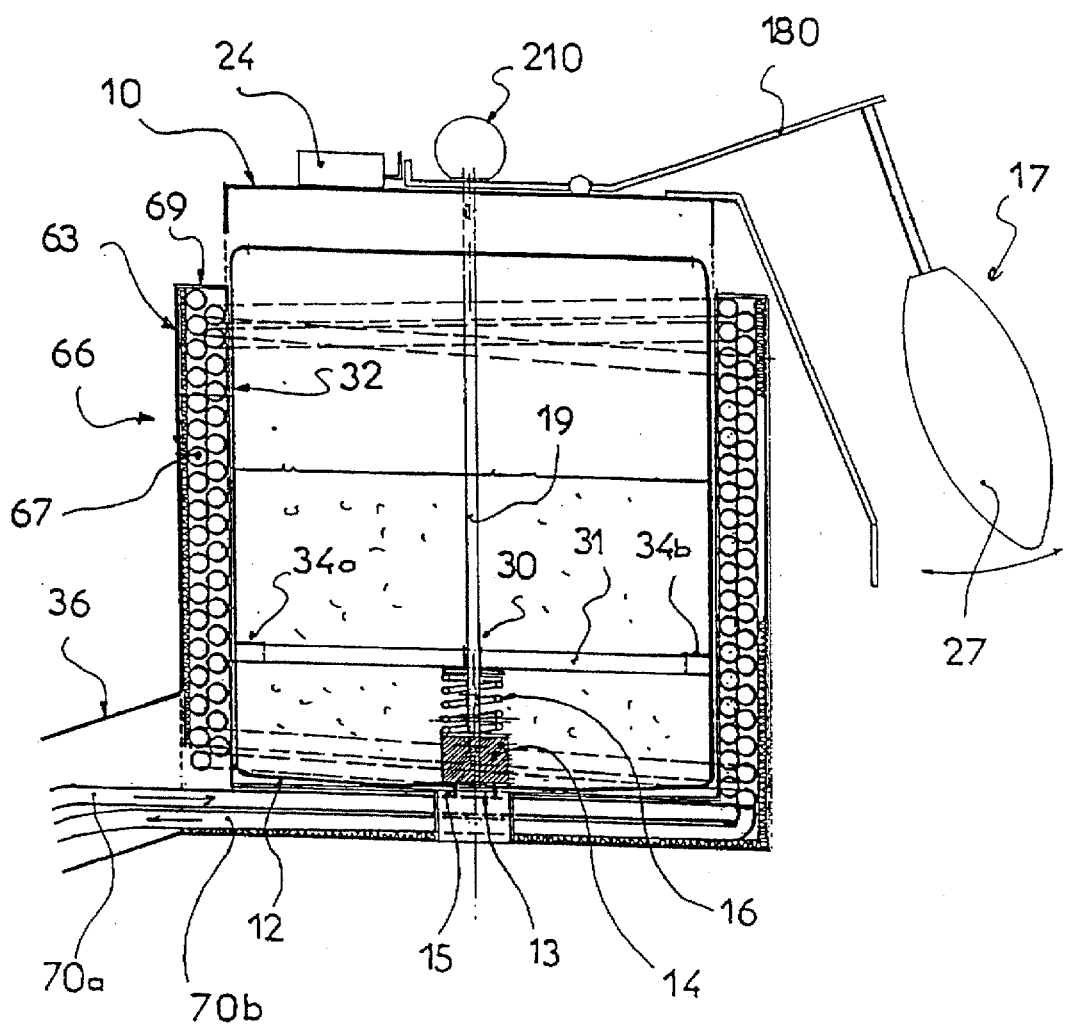

FIGS. 13, 14, and 15 illustrate another alternate embodiment where the batter dispenser includes the means of maintaining the batter at a low temperature.

FIG. 13 is a diagrammatic view of the whole installation.

FIG. 14 shows the batter dispenser with its pivotable arm.

FIG. 15 is a detailed view similar to FIG. 6 showing the batter dispenser more particularly.

Figure 16:
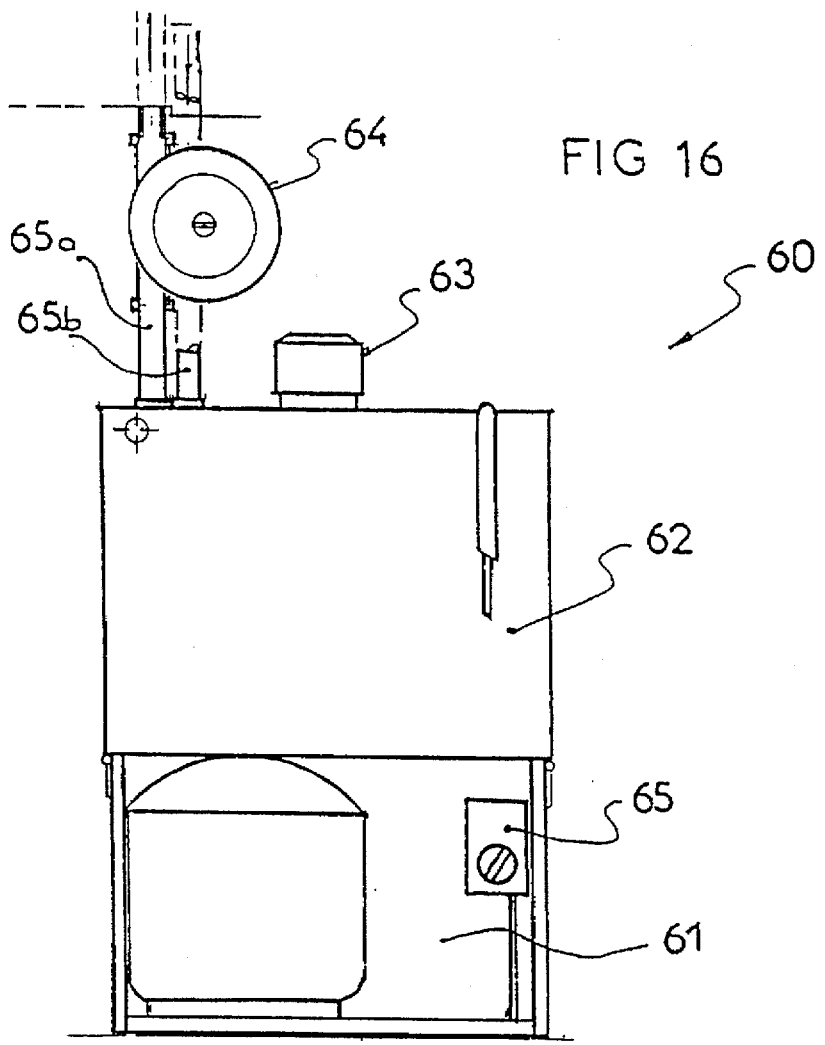

FIG. 16 illustrates the refrigeration device permitting the batter to be maintained at a low temperature.

Figure 17:
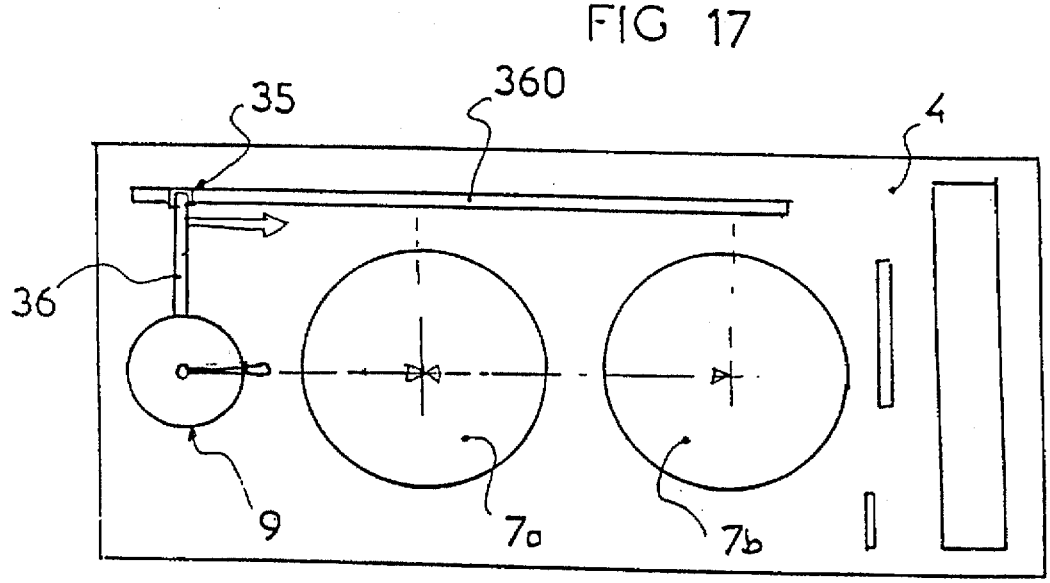

FIG. 17 is a similar view to FIG. 10, showing an alternate embodiment.

With reference to the appended figures, the preferred pancake making apparatus carries the general reference (1) and includes a work unit (2) intended for the making of pancakes, above which is positioned a movable batter dispenser (3) according to the invention.

The work unit (2), which is built-in to a work surface (400), includes primarily a platform (4) in which a heating mechanism (5) fits in such a way that the upper surface (6) of the hotplate (7) is approximately at the level or slightly higher than the upper surface (8) of the said platform (4).

The pancake batter dispenser (3) is, as we have previously said, movable and positioned above the platform and is constituted by a container of batter (9) open at the top permitting the container to be filled. Furthermore, the said container includes a lid (10) and is constituted by a peripheral wall (11) and a transverse inner wall (12) having a flow outlet (13) which includes an opening and closing assembly (MFO) constituted primarily by a stopper (14) which is movable between a closed position, in which the flow of batter (90) contained in the container is prevented, and an open position, which permits the flow of batter through the said flow outlet. Advantageously, the flow outlet is circular and extended toward the base by a lower peripheral wall (15) having a height "h" of, for example, between 5 and 15 millimeters, the said wall (15) forming an edge preventing the formation of drops after closing the flow outlet. The stopper (14) has a general form of a truncated cone and is biased into a closed position by an elastic system such as a spring (16). Furthermore, the opening movement making the stopper move from a closed position to its open position is controlled by a control means (MC) including a handlever (17) linked to the said stopper by a transmission device (DT) including in part a transverse axle (18) kinematically linked to a vertical shaft (19) connected to the stopper. The said shaft is constituted by a cylindrical member of stainless steel including at its lower end a retaining nut (20) while its upper end is folded to form a connecting hook (21) intended to cooperate with a hooking stirrup (22) connected to the central part of the transverse axle (18). The latter also being accomplished by a cylindrical member of stainless steel of which one of the ends is connected to the handlever (17) and, advantageously, its other end includes an actuating finger (23) for a counter (24). We note, furthermore, that the transverse axle (18) constitutes the pivotal axle of the handlever (17) and for this purpose, the lever is engaged, on one end, in a pivotal hole (25) defined in the peripheral wall (11) of the container and, on the other end, disposed in support in the bottom of a vertical slot (26) also defined in the peripheral wall (11) and free from obstruction up to the top edge of the said container. The handlever has the general form of a lever including a handle (27) and a projection (28) intended to limit the rotation of the lever by cooperation with the abutment (29) attached to the container (9). Furthermore, the initial defined position of the lever is adjustable, in order to be able to modify its defined travel and thus regulate the quantity of flow through an opening more or less extended by the stopper (14). The vertical shaft (19) is guided to its lower part by a guide hole (30) achieved in a transverse bar (31) which is retained in the container by two end supports (34a, 34b), each being U-shaped, open at the base, and connected to the inner surface (32) of the peripheral wall (11) of the container. The said transverse bar (31) being held in the said supports (34a, 34b) by a compression spring (16). The container (9) is pivotly mounted in relation to the work unit (2) between a resting position, in which the container is outside of the zone occupied by the hotplate, and a dispensing position, in which the flow outlet, and in particular its center (Cr), is placed above the center (Cp) of the hotplate (7). The trajectory (T) of the center (Cr) of the flow outlet (13) is a circular arc of the radius (R1). The radius (R1) is more than the radius (R2) of the hotplate. The container thus is able to be set outside of the zone occupied by the said plate, as one can see more particularly in FIG. 1. For this purpose, the container is linked to a vertical axle (35) by an intervening horizontal arm (36). The assembly constituted by the container (9) and the horizontal arm (36) is adjustable in height because of a height adjusting device (37).

The work unit and cooking unit (2) include, as we have previously said, a cooking mechanism (5) including, for instance, a hotplate (7), the said mechanism being at least partially fit into the work unit so that the opening (38) has a diameter (D1) slightly more than the diameter (D2) of the hotplate such that the excess pancake batter (91) can flow to the periphery of the plate, can pass into the peripheral space "e" and fall into a reception drawer (39) which slides out according to F1 so that it may be cleaned (see FIG. 4). This space also permits recovery of cooking drippings which are scraped from the plate after cooking. The latter being disposed by sliding the drippings to the lower part of the lower housing (40) of the work unit (2), the said housing (40) furthermore bearing the cooking mechanism (5). We also note that a means of height adjustment (41) is contemplated so as to permit the placing of the hotplate (7) at a more or less advantageous height in relation to the platform (4).

Furthermore, the apparatus includes two removable, built-in troughs (42, 44), a first elongated trough (42) holding water and intended to receive a batter scraper (45), and a second cylindrical trough (44) intended to receive an oiler (47). The said second trough holds a sponge (48) soaked in oil while the oiler (47) includes a body of wood (49) including a removable peripheral ring (50) of stainless steel intended to retain a piece of fabric or cellulose (51). The body (49) of the oiler (47) includes a projection (490) extended by a cylindrical member (49), a removable ring (50) having an inner diameter (D3) more than the diameter (D4) of the cylindrical member, while the length (L3) of the member is less than its width (L4). As one can see more particularly in FIG. 4, in its position of saturation, the fabric (51) in contact with the sponge (48) soaked in oil is saturated with oil for greasing the hotplate before cooking and the user need only take out the oiler from the trough (44), and pass it over the hotplate before putting it back in place. Furthermore, the apparatus includes a window (43) for receiving a spatula (46).

For making pancakes, it is therefore necessary to fill the container (9) with pancake batter liquid (90) in advance, the plate being hot, and the user can then, with the aid of the oiler (47), coat the hotplate. Then, the user must pivotly place the container in such a way that the center of its flow outlet (Cr) is at the center of the plate (Cp). Once the container is in its position of distribution, the user need only pivot the handlever (17) to bring it in abutment which thus causes the upward displacement of the stopper (14) and permits the flow of the batter (90) onto the plate (7). Then, the container is replaced in its resting position, the batter is spread out with the scraper (45) and the pancake is finished by turning it over with the spatula (46).

The apparatus according to the invention can be modified without having to depart from the framework of the invention. Thus, for example, FIG. 9 shows a first alternate embodiment where the upper platform (4) includes a third elongated trough (52) which holds many measuring flasks (53, 54, 55), one of these flasks containing, for example, sugar, another, chocolate, and the next, for example, jam, etc.

FIG. 10 is an illustration of another alternate embodiment where the table includes two hotplates (7a, 7b), the dispensing device being able to alternately and voluntarily be displaced from one plate to the other.

Furthermore, we note that the platform (4) is advantageously made of synthetic material, but it could be other material.

FIGS. 13 to 16 illustrate an embodiment of use according to which the apparatus includes the means permitting the maintenance of the batter at a desired temperature, for example, between 10 and 14 degrees. In this embodiment, and for permitting the best understanding, the elements similar to the modes of the preceding embodiments will have the same references and the reader will be able to refer back to the preceding description for all that is not described in this embodiment.

Thus, according to one improvement, the apparatus includes a refrigeration unit (60) which includes a compressor of conventional design (61), an evaporator (62), an agitator (63), a circulator (64) and a thermostat (65), the said refrigeration unit (60) being disposed under the work surface. Furthermore, it includes two circulation conduits of refrigeration fluid (65a, 65b), a first delivery conduit (65a) for the refrigerated fluid and a second return conduit (65b) for the refrigeration fluid. The batter dispenser (3) is such that its batter container (9) is lodged in the interior of a cylindrical support (66) carried by a pivotable arm (36) which is pivotally connected to the vertical axle (35). The temperature of the batter is maintained due to the circulation of the refrigeration fluid in a coil (67) disposed around the container of batter (3) in an annular space (69), which is, between the peripheral wall (11) of the container of batter (9) and the peripheral wall (68) of the cylindrical support (66). We note that the coil (67) includes a conduit for the arrival of refrigerated fluid (70a) and a conduit for the return of the refrigeration fluid (70b) which are connected respectively to the corresponding conduit (65a, 65b) of the refrigeration unit by the middle of flexible tubes (71a, 71b) permitting the pivot of the arm (36) with its support (66) and its container of batter (9) due to the fact, it is well understood, that in this embodiment, the batter dispenser is pivotly disposed above the work surface which includes an oblong accommodation permitting the passage of the flexible tubes. All other means of refrigeration can be adapted.

The displacement of the batter dispenser can be other than a pivot, like for example, by a translating movement. FIG. 17 illustrates in diagrammatic view an accomplishment according to which the container translates in relation to the work surface along, for example, a longitudinal rail (360).

It is well understood that the invention is not limited to the methods of accomplishment described and represented in these examples, but it includes all technical equivalents as well as their combinations.

I claim:

1. A pancake batter dispensing device for an apparatus for making pancakes, including a hotplate (7), a container (9) containing a supply of batter (90) and which includes a flow outlet (13) with an opening and closing assembly (MFO), said container (9) retained on a work unit (2) and movable relative to the hotplate (7), in a resting position, in which the container is outside of a zone occupied by the hotplate, and a dispensing position in which the outlet is above and in the center of the hotplate.

2. A pancake batter dispensing device according to claim 1, characterized in that the container is mounted for pivotal movement around a vertical axle (35).

3. A pancake batter dispensing device according to claim 2, characterized in that the container is retained on a vertical axle (35) by a retaining arm (36).

4. A pancake batter dispensing device according to claim 1, characterized in that the container includes a flow-controlling assembly (17, 18, 19, 28, 29).

5. A pancake batter dispensing device according to claim 4, characterized in that the flow outlet includes a stopper (14) in a closed position, in which the flow of batter contained within the container is prevented, and which stopper is movable to an open position in which the flow of batter is permitted, the movement of the stopper in an open position being controlled by a control means (MC) which includes a handlever (17) linked to the stopper by a transmission device (18, 19, 21, 22).

6. A pancake batter dispensing device according to claim 1, characterized by a cooling unit (67) for the batter.

7. A pancake batter dispensing device according to claim 6, in which refrigerating of the batter (90) is due to the circulation of refrigeration fluid in a coil (67) placed around the container (3) in an annular space (69), more particularly described as the space between a peripheral wall (11) of the container of batter (9) and a peripheral wall (68) of a cylindrical support (66).

8. An apparatus for making pancakes including the device according to claim 1, characterized in that a work unit (2) includes a platform (4) including at least one opening (38) in which at least one heating mechanism (5) is fitted.

9. An apparatus for making pancakes according to claim 7 characterized by a lower housing (40) which contains the heating mechanism (5) and a sliding drawer (39).

10. An apparatus for making pancakes according to claim 8, characterized by the platform (4) including at least one removable, built-in trough (42, 44, 52).

11. An apparatus for making pancakes according to claim 10, characterized by a trough (44) including a sponge (48) soaked in oil, said trough (44) for receiving an oiler (47) which is constituted by a body of wood (49) including a peripheral ring (50) which retains a piece of fabric or cellulose (51) in the center.

12. An apparatus for making pancakes according to claim 8, characterized by a refrigeration unit (60).

* * * * *